(12) United States Patent
Waide et al.

(10) Patent No.: US 8,235,667 B2
(45) Date of Patent: Aug. 7, 2012

(54) SWASHPLATELESS ROTORCRAFT WITH FAULT TOLERANT LINEAR ELECTRIC ACTUATOR

(75) Inventors: William Martin Waide, Wrightwood, CA (US); Abe Karem, Tustin, CA (US); Dan Patt, Lake Forest, CA (US)

(73) Assignee: Karem Aircraft, Inc., Lake Forest, CA (US)

( * ) Notice: Subject to any disclaimer, the term of this patent is extended or adjusted under 35 U.S.C. 154(b) by 703 days.

(21) Appl. No.: 12/383,310

(22) Filed: Mar. 23, 2009

(65) Prior Publication Data

US 2010/0150719 A1 Jun. 17, 2010

Related U.S. Application Data

(60) Provisional application No. 61/122,219, filed on Dec. 12, 2008.

(51) Int. Cl.
*B64C 9/00* (2006.01)
*B64C 27/39* (2006.01)
*B64C 27/68* (2006.01)

(52) U.S. Cl. .................................................. 416/155

(58) Field of Classification Search ................ 416/147, 416/155; 244/17.13, 17.25, 39; 310/15, 310/17, 20, 80
See application file for complete search history.

(56) References Cited

U.S. PATENT DOCUMENTS

| | | | |
|---|---|---|---|
| 3,008,525 A * | 11/1961 | Jensen | 416/61 |
| 3,462,667 A * | 8/1969 | Jackson | 318/696 |
| 4,132,914 A * | 1/1979 | Khutoretsky et al. | 310/184 |
| 4,823,040 A * | 4/1989 | Oudet | 310/268 |
| 5,165,854 A * | 11/1992 | Cicare | 416/147 |
| 5,491,372 A * | 2/1996 | Erhart | 310/80 |
| 5,557,154 A | 9/1996 | Erhart | |
| 6,032,899 A * | 3/2000 | Mondet et al. | 244/17.25 |
| 6,135,713 A * | 10/2000 | Domzalski et al. | 416/23 |
| 6,415,599 B1* | 7/2002 | Ausdenmoore et al. | 60/230 |
| 6,666,649 B2 | 12/2003 | Arnold | |
| 7,081,697 B2* | 7/2006 | Neet | 310/216.011 |
| 2006/0266146 A1 | 11/2006 | Waide | |
| 2007/0131820 A1* | 6/2007 | Chaudhry et al. | 244/17.25 |
| 2008/0095627 A1* | 4/2008 | Castillo | 416/147 |
| 2008/0279685 A1* | 11/2008 | Kessler et al. | 416/31 |

* cited by examiner

*Primary Examiner* — Edward Look
*Assistant Examiner* — Sean J Younger
(74) *Attorney, Agent, or Firm* — Fish & Associates, PC

(57) ABSTRACT

An electric linear actuator is disposed to pitch a blade of a hingeless, swashplateless rotor in rotary motion. This actuator can be equipped with an electric motor advantageously made fault tolerant by winding the motor for at least 4, 5, 6, 8, or even 12 phases. Rotational motion of the electric motor is preferably converted to a translatory linear actuator output motion using a planetary roller screw coupling the rotation of the motor with pitch of the blade. The output link of the actuator can be advantageously coupled to the planetary roller screw using an internal spherical joint providing an isolated load path through the actuator. It is contemplated that a preferred rotorcraft having an electric blade pitch actuator might also be equipped with a controller that could provide the vehicle with individual blade control, in which the pitch of any rotor blade can be controlled independently of the others.

7 Claims, 8 Drawing Sheets

SWASHPLATELESS ROTORCRAFT WITH FAULT TOLERANT LINEAR ELECTRIC ACTUATOR

This application claims priority to U.S. Provisional Application Ser. No. 61/122,219 filed Dec. 12, 2008, which is incorporated by reference herein in its entirety.

FIELD OF THE INVENTION

The field of the invention is rotorcraft.

BACKGROUND

Current rotorcraft typically achieve controlled flight through the use of a swashplate as shown in FIG. 1. A pilot moves controls 110 which are coupled physically, hydraulically, or electrically to control linkages 120 that do not rotate with the rotor 130. The control linkages 120 can move a swashplate 160 up and down 162 in a collective move or tilt 164 the swashplate 160 in a cyclic 164 mode. The swashplate 160 transfers the motions of the non-rotating control linkages 120 to rotating pitch links 170. The pitch links 170 are coupled to blades 180 such that the blade is caused to rotate about its pitch axis 182. Collective control of blade pitch varies the thrust produced by the rotor, while cyclic control of blade pitch is used to control the direction of rotor force and moment. A pilot usually achieves vehicle directional control primarily through these collective and cyclic controls.

Cyclic input on a normal swashplate is usually constrained to a simple harmonic input with a frequency of one peak per rotor revolution. When the pilot commands cyclic control, the control linkages tilt the swashplate, causing one location of the swashplate to be higher than the rest of the swashplate. When a pitch link passes over this high point, the pitch of the blade is raised, which leads to increase in lift in the vicinity of the high portion of the swashplate.

Such swashplate systems are well-established in the rotorcraft industry. While swashplates offer a means of controlling a rotorcraft, they are large, heavy, complex, and prone to failure. The bearings necessary to transfer motion from non-rotating control linkages to rotating pitchlinks need lubrication and may fail. The mechanical or hydraulic systems associated with such a system are almost invariably complicated, and burden the rotorcraft with additional weight. Mechanical and hydraulic systems also have higher failure rates and maintenance requirements than all-electric systems.

It is further known in the industry that helicopter vibration can be reduced if the pitch of the rotor blades can be controlled at frequencies other than the simple cyclic control input with a frequency of one peak per rotor revolution. This is referred to as individual blade control.

One such system that achieves control of individual blade control is that of U.S. Pat. No. 6,666,649 ('649 patent) to Arnold shown in FIG. 2. Arnold combines a conventional swashplate with active pitch links 200 that are activated in the rotating frame. The pitch links must receive hydraulic fluid and electrical control signals through a slipring, which transfers fluid and electricity from the fixed frame to the rotating frame. Because the system of Arnold requires both a conventional swashplate and a slipring, it has complexity and weight exceeding that of a normal rotorcraft. The additional complexity and weight of the Arnold system make it impractical for use on rotorcraft.

The '649 patent and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply. Unless a contrary intent is apparent from the context, all ranges recited herein are inclusive of their endpoints, and open-ended ranges should be interpreted to include only commercially practical values. Similarly, all lists of values should be considered as inclusive of intermediate values unless the context indicates the contrary.

Another system that achieves individual blade control was developed by ZF Luftahrttechnik™ and described in the 2008 paper "Experimental Verification of an Electro-Mechanical-Actuator for a Swashplateless Primary and Individual Blade Control System". The prior art ZF actuator concept is shown in FIG. 3. In this system, the swashplate is eliminated in favor of an electric slipring, which transfers electric power from the fixed frame to the rotating frame. As used herein, the term "swashplateless rotor" means a rotorcraft rotor not having a swashplate. Removal of the swashplate significantly reduces weight and complexity. The prior art ZF actuator 300 has a multiple phase redundant electric motor 310 that is coupled to a rotary gearbox 320 to drive the pitch of the rotor blades. The phase redundant electric motor is key to achieving fault tolerant vehicle control in flight. The prior art ZF actuator has a key disadvantage as compared to a conventional swashplate system or the Arnold system in that the ZF actuator is subject to some of the loads transferred from the rotor to the hub. Additionally, the use of rotary gearbox causes increased weight, relatively higher transmission losses, and is subject to backlash. This prior art system was designed for used on the prior art CH-53G helicopter which has an articulated (or hinged) rotor system.

Electric linear actuators, such as the planetary roller screw actuator described by Waide in US Patent Application 2006/0266146 are free of the problems of actuators coupled to rotary gearboxes. Shown in FIG. 4, the Waide actuator is designed to replace the fixed-frame control linkages coupled to the swashplate, and thus still requires a heavy swashplate. Furthermore, the Waide actuator does not have a multiple phase redundant electric motor beneficial to fault-tolerant flight control.

Other linear actuators use inverted rollers screws. See e.g., U.S. Pat. Nos. 5,491,372 and 5,557,154 to Erhart. Those actuators are not fault tolerant, do not include redundant motors, and have not been contemplated for individual blade control.

Therefore, what is still needed is a rotorcraft rotor blade control system that has reduced maintenance requirements, weight, complexity, and increased reliability. It should further be fault-tolerant, of low weight, and capable of reducing rotor vibration.

SUMMARY OF THE INVENTION

The present invention provides apparatus, systems, and methods in which an electric linear actuator is disposed to pitch a blade of a hingeless, swashplateless rotor in rotary motion.

This actuator is equipped with an electric motor advantageously made fault tolerant by winding the motor for at least 4, 5, 6, 8, or even 12 phases. Rotational motion of the electric motor is preferably converted to a translatory linear actuator output motion using a planetary roller screw coupling the rotation of the motor with pitch of the blade.

In preferred embodiments, the rotor blade is mounted to a rotor hub, and at least a portion of the motor is disposed external to the hub and to the blade. In especially preferred embodiments, this disposition is configured in such a way that the actuator can be removed without removing the blade.

The output link of the actuator can be advantageously coupled to the planetary roller screw using an internal spherical joint which provides an isolated load path through the actuator.

It is contemplated that a preferred rotorcraft having an electric blade pitch actuator might also be equipped with a controller that could provide the vehicle with individual blade control, in which the pitch of any rotor blade can be controlled independently of the others.

DETAILED DESCRIPTION

This specification reveals several inventive apparatus, systems, and methods for providing all-electric fault-tolerant rotor blade control. An especially preferred embodiment is an electric fault-tolerant linear output actuator for a hingeless, swashplateless rotor rotorcraft. As used herein, a "hingeless rotor" is a rotor without discrete mechanical hinges for blade articulation in the flap or lag direction. Hingeless rotor systems have very different behaviors than articulated rotor systems, including higher pitch bearing friction loads, and have different actuation force and size requirements.

Figure 5:
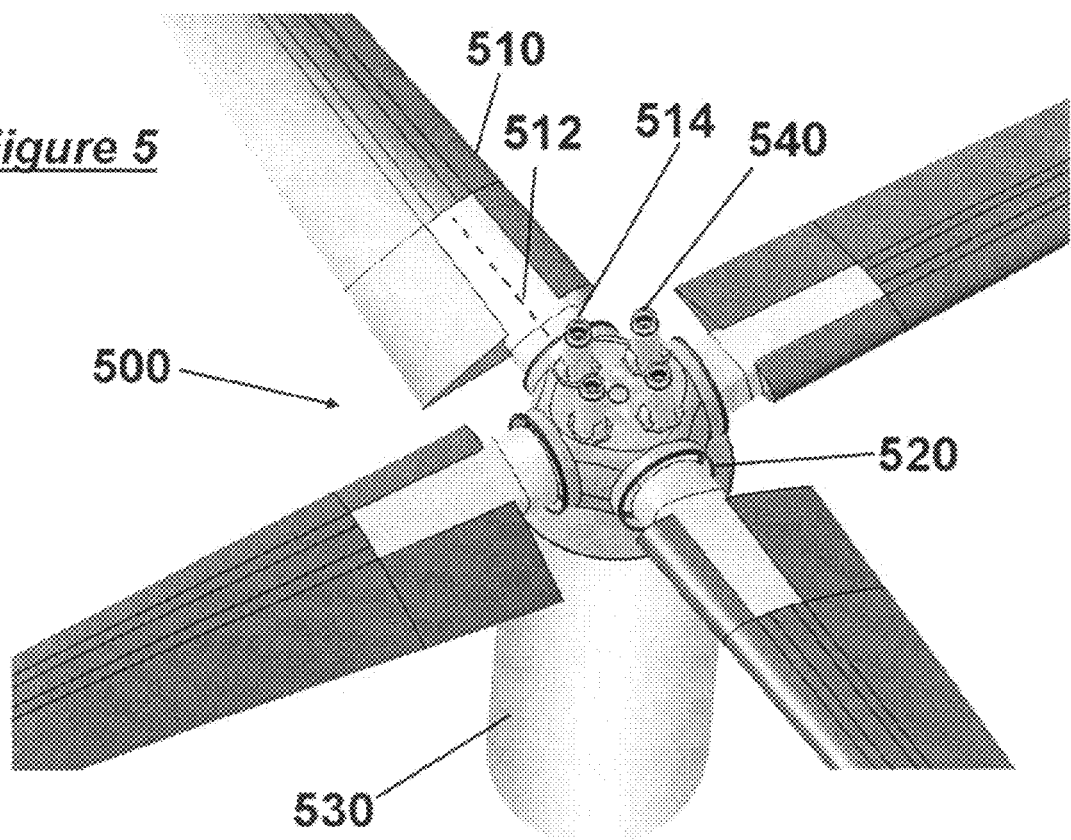
FIG. 5 is a perspective illustration a preferred general arrangement of actuators on a rotor and rotor hub.

FIG. 5 shows an overview of a preferred hingeless, swashplateless rotor system. The rotor 500 comprises blades 510 coupled to a rotating hub 520 by means of a blade shank 514 which permits pitching of the blade 510 relative the hub 520 about a pitch axis 512. The hub 520 turns relative to non-rotating structure 530 of a rotorcraft. Electric linear actuators 540 are coupled to the hub 520 and blade shank 514 in such a way that extension or contraction of the linear actuator causes the blade 510 to pitch about its pitch axis 512.

Figure 6:
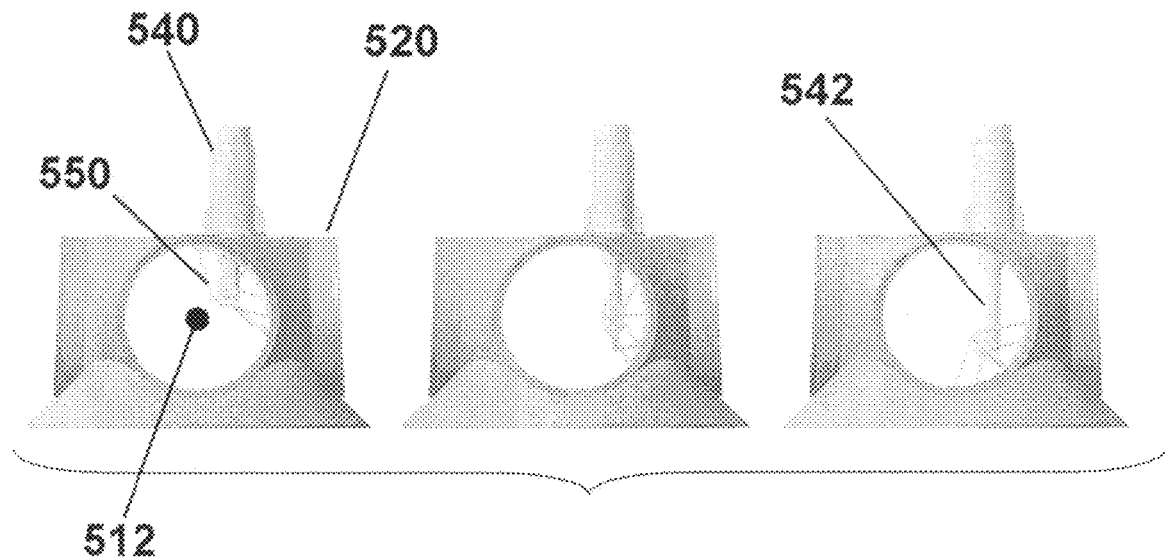
FIG. 6 is an illustration of the functioning of a preferred mechanism for coupling linear actuator motion with blade pitch motion.

In preferred embodiments, a parallel linkage (Watt's linkage) is used to transform linear motion of the actuator 550 to pitch motion of the blade 510 as shown in FIG. 6. The housing of the actuator 540 remains stationary relative to the hub 520, while an actuator output shaft 542 translates relative to the housing of the actuator. The translatory motion of the output shaft 542 is input into a parallel linkage assembly 550 which outputs a rotary pitching motion about the blade pitch axis 512.

The actuator 540 is advantageously coupled to the hub 520 and blade shank 514 to isolate the loads carried by the actuator 540 and actuator shaft 542. It can also be observed that the majority of the actuator 540 and motor inside is disposed external to the hub 520 and to the blade shank 514, which allows the hub to be of compact size.

Figure 7:
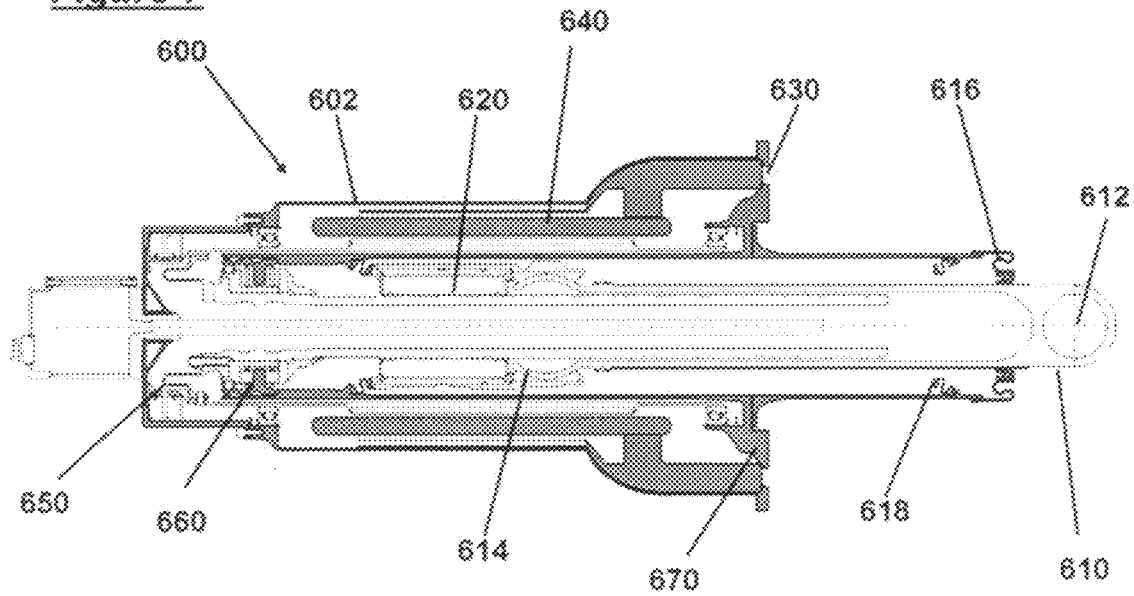
FIG. 7 is a cutaway diagram of a preferred electric actuator.

Another perspective on the preferred actuator and load-isolating design features of the actuator is shown in FIG. 7. The actuator 600 has housing 602 that is mounted to the hub at a mounting point 630. The actuator has a linear output shaft 610 that has a spherical output joint 612 and a spherical interior mounting joint 614. This interior spherical joint provides two main functions for the actuator. As shown, the internal spherical joint 614 allows 3° of angular travel and compensates for any misalignment between the actuator 600 and the hub 520 to which it is mounted, or resulting from the Watt's linkage travel. The internal spherical joint 614 could be designed to accommodate other amounts of angular travel, including for example at least 2°, 4°, 6°, or even 8°. Additionally, the internal spherical joint creates an isolated load path which theoretically transmits no moments and only translatory force into the actuator. As used herein, an "internal spherical joint" as relating to an actuator is a joint that remains inside the bounds of the actuator casing during the full range of actuator motion and allows angular motion in at least two orthogonal directions.

The linear motion of the output shaft 610 is converted to rotary motion of the motor 640 by a planetary roller screw assembly 620. The translation loads transmitted from the actuator output shaft 610 to the planetary roller screw assembly 620 are isolated by a thrust bearing bench 660. The central race of the thrust bearing bench 660 transmits all actuator loads to the load carrying case 670 of the actuator, which in turn is transmitted through mount points 630. This case is preferably made out of a high strength material with long fatigue life such as titanium. The thrust bearing bench 660 comprises cylindrical rolling element bearings to carry the translatory forces for both extension and retraction of the actuator output shaft 610. The thrust bearing bench 660 also contains a highly populated set or rollers to bear the centrifugal forces of the rotating assembly. The bench allows for the isolation of the torque producing motor and the translatory force producing actuator output shaft 610. An additional load-isolating flexible element 650 is included in the rotary portion of the actuator to prevent transmission of shear forces or bending moments into the motor. These load isolating features allow the actuator components to be designed to a specific function resulting in a light weight actuator important to rotorcraft.

Figure 8:
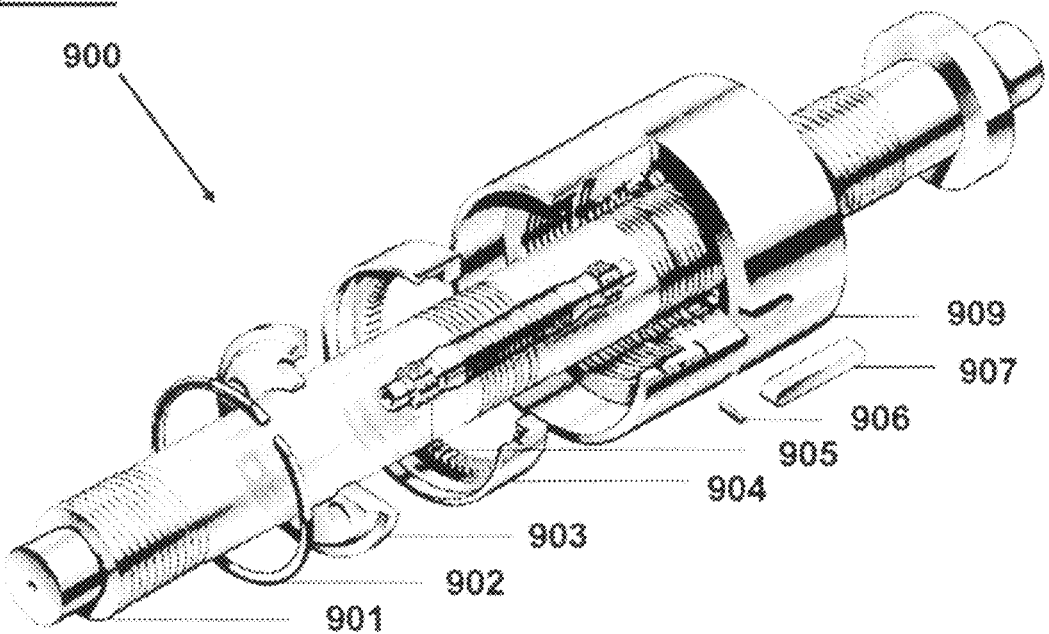
FIG. 8 is a perspective partial cutaway of a planetary roller screw.

FIG. 8 shows a planetary roller screw assembly 900, which is used to convert rotation of an actuator motor to translation of an actuator output rod. An exemplary planetary roller screw assembly consists of a screw shaft 901 and a roller nut 909. Several planetary rollers 905 are arranged parallel to the shaft's axis of rotation, and housed between the screw 901 and the roller nut 909. The one-piece roller nut can be preloaded with oversized roller to achieve a desired degree of rigidity and axial play. The geared ends of the planetary rollers mesh with the internally geared rings 904, inserted into each end of the roller nut 909. The planetary rollers 905 have a single-start thread with a crowned flank. This distributes the stresses of thread engagement on larger ellipses thereby reducing contact and edge stresses. The planetary rollers 905 have journals at each end which are guided by the holes of the carrier plates 903. The circumferential distribution of the planetary rollers 905 is provided by the carrier plates 903 which also function as labyrinth seal. The planetary rollers 905 rotate without slipping in the roller nut 909, making the entire system a rolling element structure. They have no axial movement relative to the roller nut as both the nut and rollers translate by equal amounts. The carrier plates 903 are retained by snap rings 902.

Figure 9:
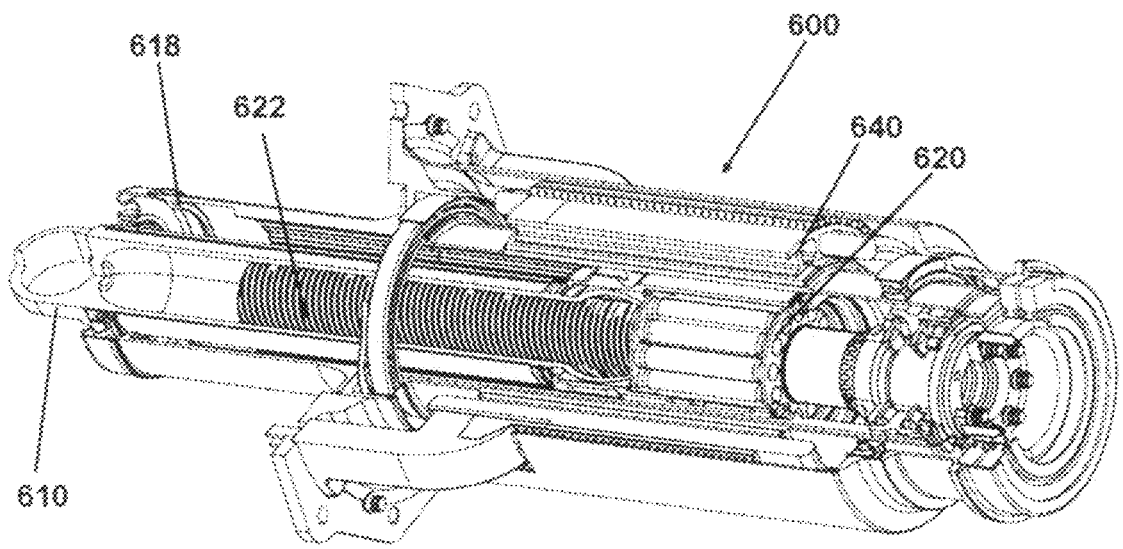
FIG. 9 is a perspective cutaway drawing of a preferred actuator.

FIG. 9 is a cutaway view of a preferred actuator. The actuator 600 creates linear motion at the actuator output shaft 610 from the motor 640 without the use of gears by means of a planetary roller screw assembly 620. This direct drive design results in little or no backlash, and therefore a rigid (high stiffness) actuator with a high response frequency. Despite not having any gearing, the actuation ratio or output ratio between motor angle and resulting blade feather angle can be tailored. This output ratio can be adjusted by the selection of the planetary roller screw assembly's lead 622, or adjustment of the Watt's linkage dimensions. The design can therefore be adapted for different actuator response requirements, matching to rotor blade inertia, and different motor sizes. A mechanical stop 618 limits the maximum actuation stroke of the actuator 600.

Figure 10:
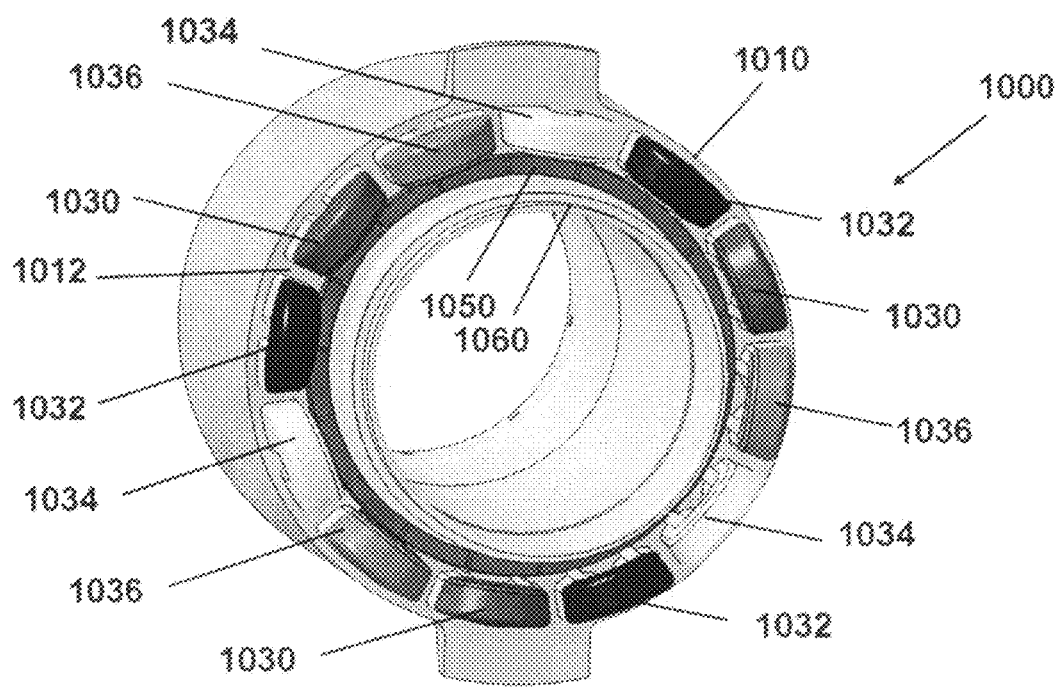
FIG. 10 is an illustration of the multiple phase motor portion of the electric actuator.

In especially preferred embodiments, the rotary motion that drives the planetary roller screw assembly and linear output motion is generated by a multi-phase fault-tolerant brushless direct current (DC) motor. The motor incorporates features that allow it to continue operating even in the presence of one or more failures. FIG. 10 shows the stationary portions of an exemplary motor 1000, comprised of a metal stator 1010 and a series of 12 phase windings 1030 embedded within the stator 1010. Stator 1010 preferably comprises a stack of laminated sheets of magnetic steel that have been pressed together. The windings are advantageously coils of copper wire, wound as shown and connected in series to form four sets of three windings, 1030, 1032, 1034, 1036 which are each independently tied to the power source to constitute four motor phases. It is contemplated that fault tolerant motors could be wound for at least 4, 6, 8, 10, or even 12 phases. Each phase could be composed of 2, 3, 4, 5, or even 6 windings. Each winding generates a magnetic field by means of externally-applied electric current. This magnetic field reacts with the field produced by a series of permanent magnets 1050 located on a central rotor 1060, producing a shear force that results in torque on the output shaft (not shown) coupled to the central rotor.

As used herein, "fault tolerant motors" are motors that can continue to provide rated service after specified internal failures have occurred. In practical usage, fault tolerance also implies that a single failure or series of discrete failures should not propagate, triggering further subsequent failures. This fault tolerance can be achieved by observing the separation of adjacent phase windings thermally, magnetically, and electrically.

In preferred embodiments, thermal isolation is achieved by arrangement of the windings such that a full stator tooth 1012 lies between neighboring phase windings 1030, 1032. In the case of a winding failure leading to elevated temperature due to short circuit, this unwound tooth 1012 will absorb the excess heat, propagating it out through the stator 1010 before it can cause any further damage to nearby windings. This differs from standard industry practice, where a dual layer winding is used, with dissimilar windings spanning different teeth next to each other with no physical separation. In the dual layer case heat in one winding can transfer directly into the neighboring winding, allowing one fault to cause two winding failures, and violating the principle of fault tolerance.

Magnetic isolation in preferred embodiments is achieved by placing high-permanence material between each consecutive winding. In case of a failure this provides a path for magnetic flux to flow without interacting with neighboring windings. If this path were not available, flux would induce large fault currents in neighboring windings, which could lead to subsidiary failures. Once again this represents a departure from conventional motor design, where the physical proximity of dual layer windings allows magnetic interaction between them.

Figure 11:
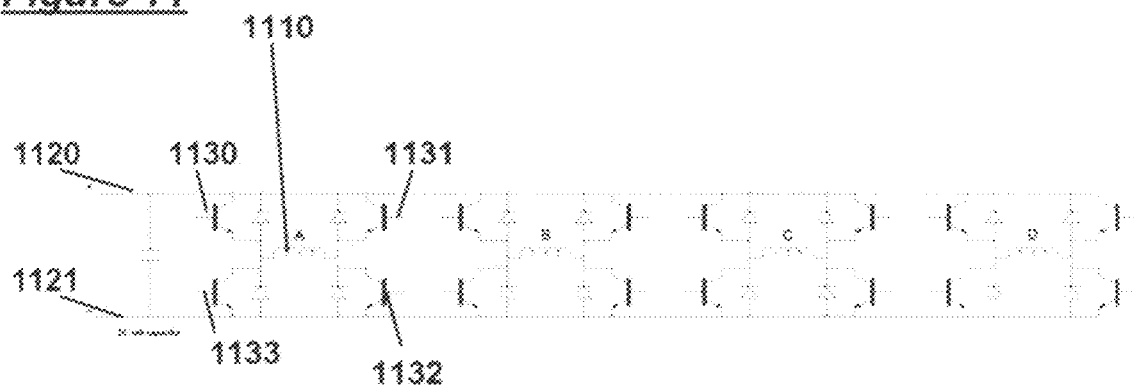
FIG. 11 is a diagram of a preferred motor electrical control for fault tolerance.

Electric isolation between windings is preferably achieved by means of an electronic driver circuit allowing full isolation of each phase from the others. FIG. 11 is a schematic of a preferred device. A motor phase 1110 can be completely disconnected from the power supply rails 1120 and 1121 by its attendant power electronic switches 1130 through 1133. This allows a faulted winding to be taken off-line. In the case of an open-circuit failure, the winding is merely taken out of service. In the case of a short-circuited winding, the worst case is when the short circuit occurs right at the motor terminals, and hence the inductance of the winding is the highest. For a given magnetic excitation, induced current is proportional to inductance. Hence, the highest-inductance winding will have the largest amount of current induced into it. A short-circuited winding constitutes an electromagnetic brake, where currents are induced in the winding as the driven rotor passes it by. Having nowhere to go, these currents in turn act to set up a "reaction field" that counteracts the force of the rotor. Due to the very low resistance of a motor coil, these fault currents can produce significant heat load, potentially able to overwhelm the thermal capacity of the system, leading to further faults. Therefore, they must be limited by designing the winding to have leakage inductance sufficiently high.

Figure 12:
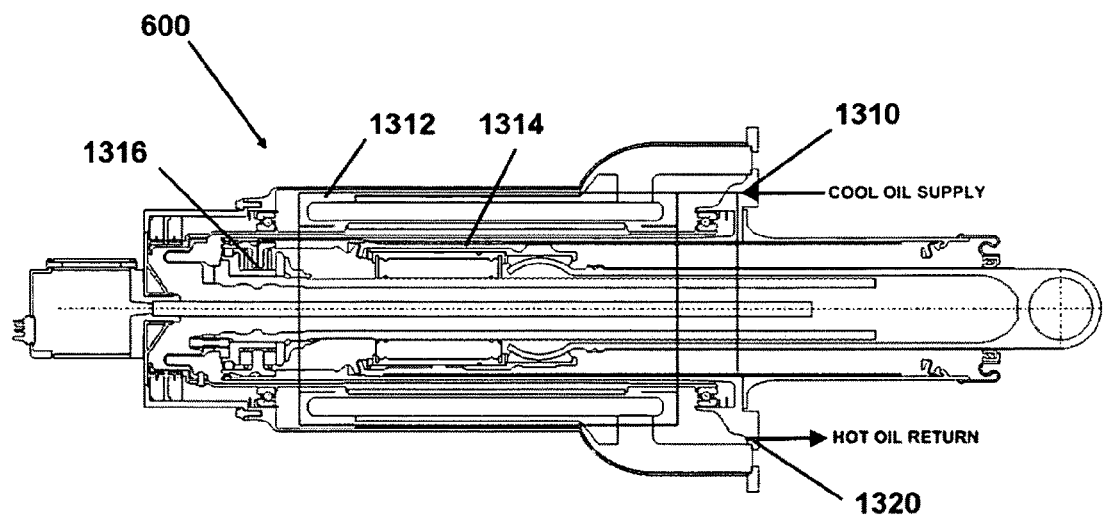
FIG. 12 is a schematic of a preferred liquid cooled actuator

The actuator 600 is preferably liquid cooled as shown in FIG. 12, although all suitable cooling methods including conductive, radiative, and Peltier cooling. If liquid cooled, the preferred cooling medium is oil because lubrication and cooling function can be combined, although all suitable cooling mediums including ethylene glycol, mercury, and water are contemplated. Cool oil enters an inlet channel 1310 of the actuator 600, circulates through stator cooling channels 1312, planetary roller screw channels 1314 and bearing cooling and lubrication channels 1316 before exiting through a hot oil return channel 1320.

Figure 13:
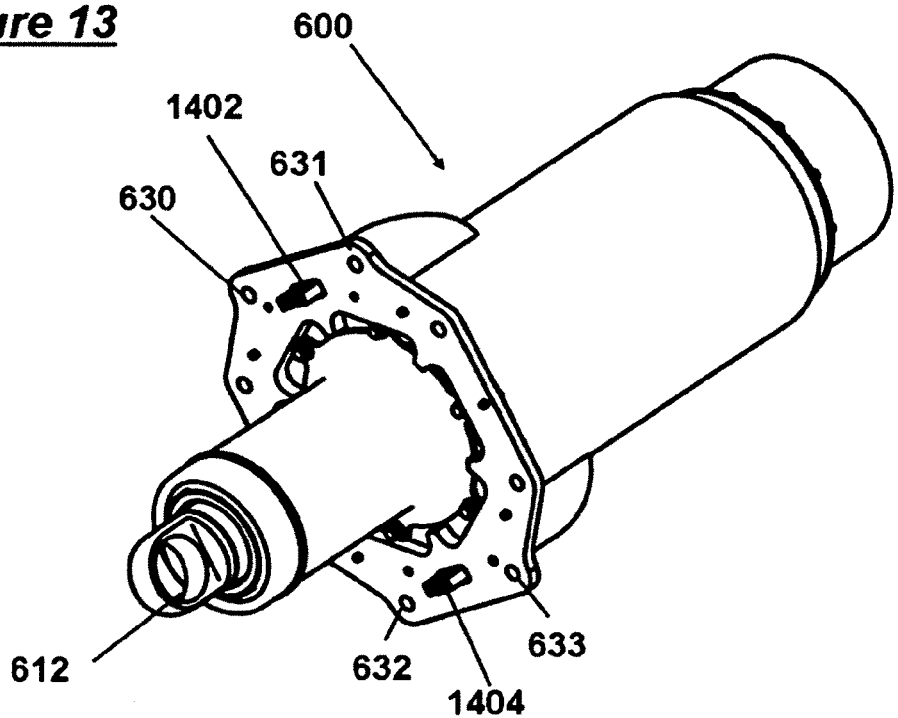
FIG. 13 is a perspective drawing showing actuator features which allow a blade pitch actuator to be removed or installed without removing the associated rotor blade.
Figure 14:
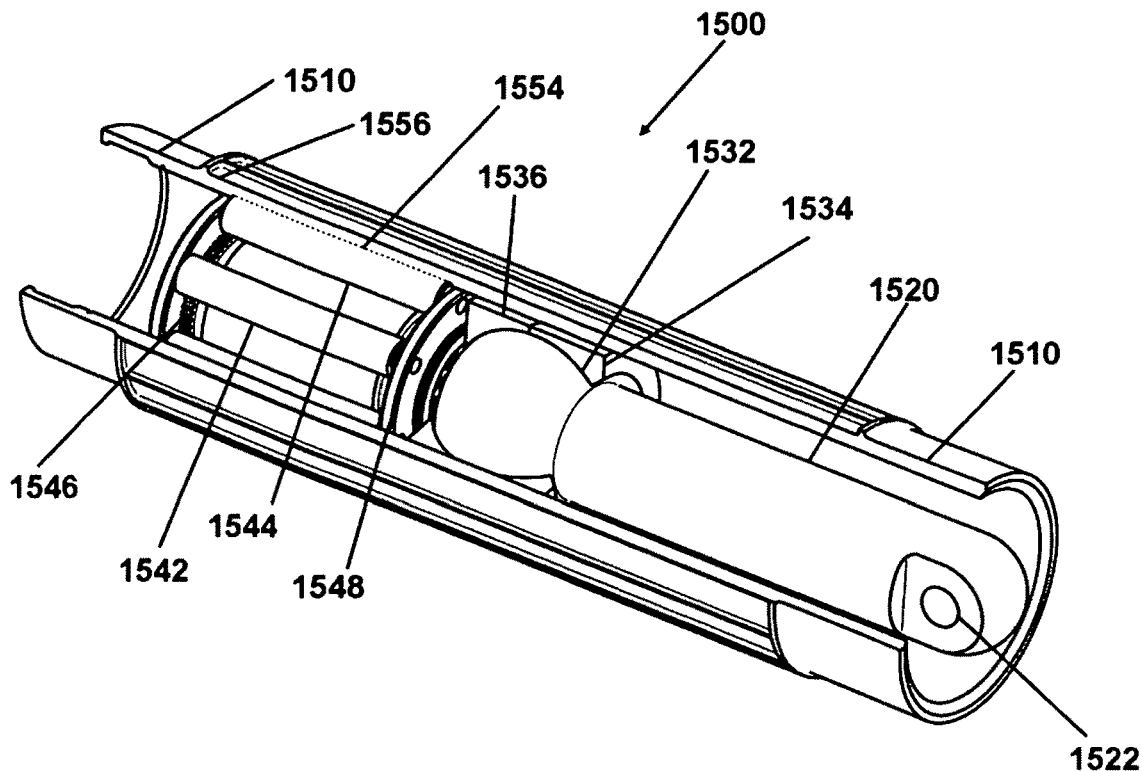
FIG. 14 is a perspective drawing of the mechanical output portion of an alternate preferred actuator comprising an inverted roller screw.

FIG. 13 illustrates some of the features which combine to make a preferred actuator 600 a line-replaceable unit. As used herein, an actuator that is a "line-replaceable unit" means an actuator that can be removed or uncoupled from the rotorcraft without removing or uncoupling the associated blade from a rotorcraft. An actuator 600 can be connected to a rotorcraft rotor hub or other device through mounting points 630, 631, 632, 633. Cooling and lubrication channels 1310, 1320 could be connected. Additionally, electrical connections 1402, 1404 are attached. These connections could be hard-mounted to the actuator as shown in FIG. 14, or could be removable connectors with pin fittings such as Cannon™ plugs. The actuator spherical output joint 612 must also be connected to a Watt's linkage, aerodynamic control surface, or other output. It is contemplated that the combination of these features allow the actuator to be easily replaced with an identical part. In especially preferred embodiments, the control electronics and any associated actuator calibrations are coupled to the actuator and are included in the line replaceable unit.

FIG. 14 is a perspective illustration of the mechanical output portion 1500 of an alternate preferred actuator. This mechanical output portion 1500 features what is known as an inverted roller screw or female roller screw. In the depicted configuration, An output shaft 1520 is substantially disposed inside a nut 1510 when the mechanical output portion 1500 of the actuator is in the retracted position. An output link 1522 is situated at one end of the output shaft 1520, while at the opposite end, a spherical joint allows for angular movement in three directions. The spherical joint comprises a ball 1532 coupled to the output shaft 1520. The ball 1532 is predominately encased by a front socket 1534 and a rear socket 1536, which function restrict lateral motion of the ball 1532 with respect to the nut 1510.

Magnet cavities 1556 are advantageously included during the manufacturing of the nut 1510, allowing the compact placement of permanent magnet portions of an actuator motor. Lateral motion of the shaft 1520 including extension and retraction is preferably accomplished using an inverted roller screw, in which rollers 1542, 1544 are coupled to a washer 1548, and mesh with a screw shaft gear track 1546 in order to maintain uniform spacing and stay in alignment. An exemplary roller 1544 has threads (not shown) that mesh with the nut 1510 at an interface 1554.

Figure 15:
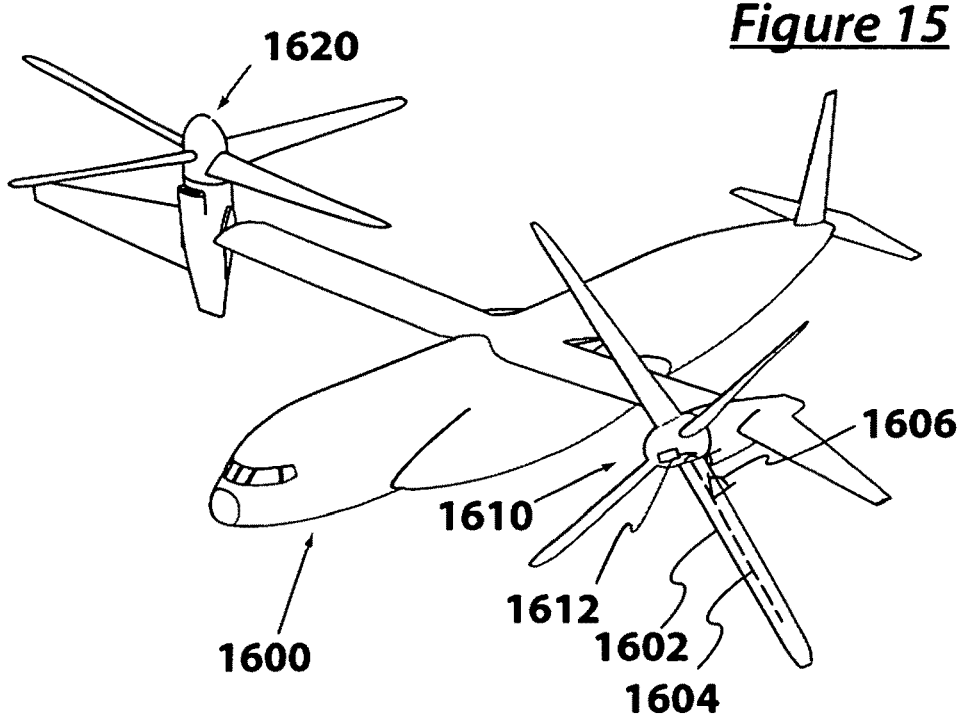
FIG. 15 is a perspective illustration of a preferred rotorcraft having first and second hingeless, swashplateless rotors configured for cruise and hover flight, respectively.

FIG. 15 is a perspective illustration of a preferred rotorcraft having first and second hingeless, swashplateless rotors 1610, 1620 configured for cruise and hover flight, respectively. A rotor blade 1602 is configured to pitch about a pitch axis 1604, and can be rotated through a pitch angle 1606. An electric linear actuator 1612 is coupled to the blade 1602 and configured to provide pitch control.

Figure 1:
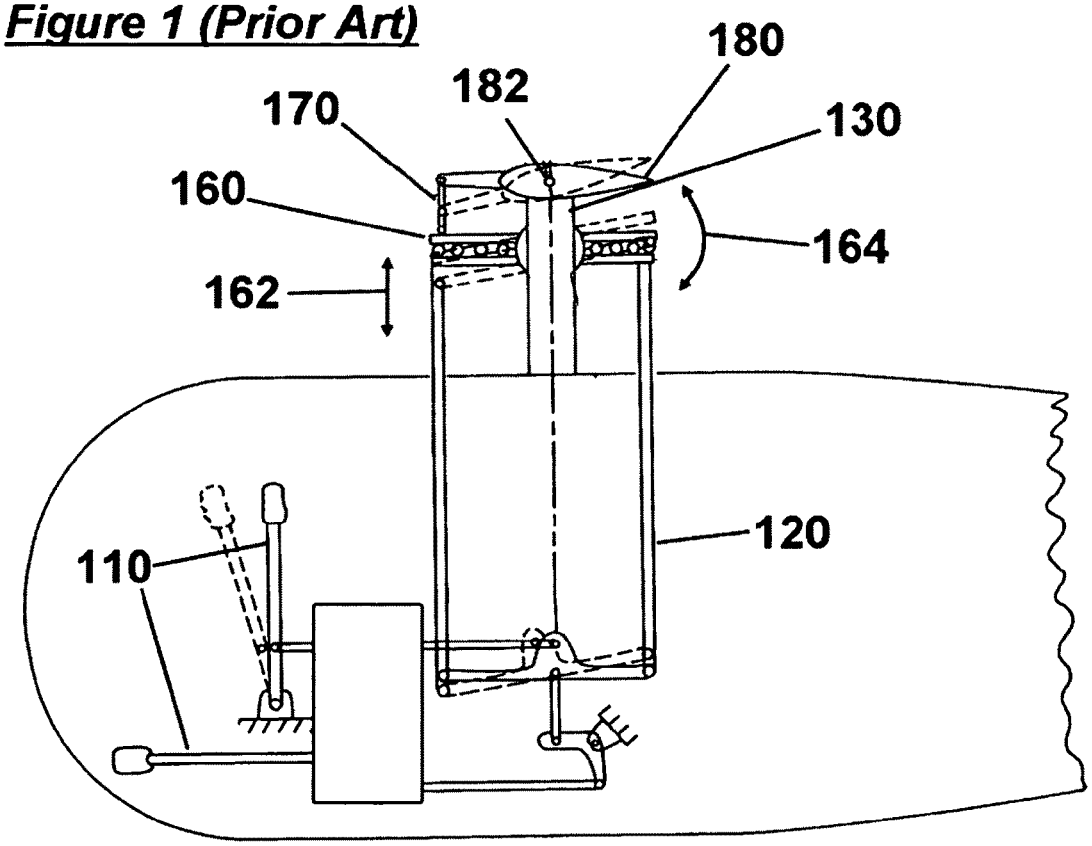
FIG. 1 is an schematic of a prior art helicopter control system.
Figure 2:
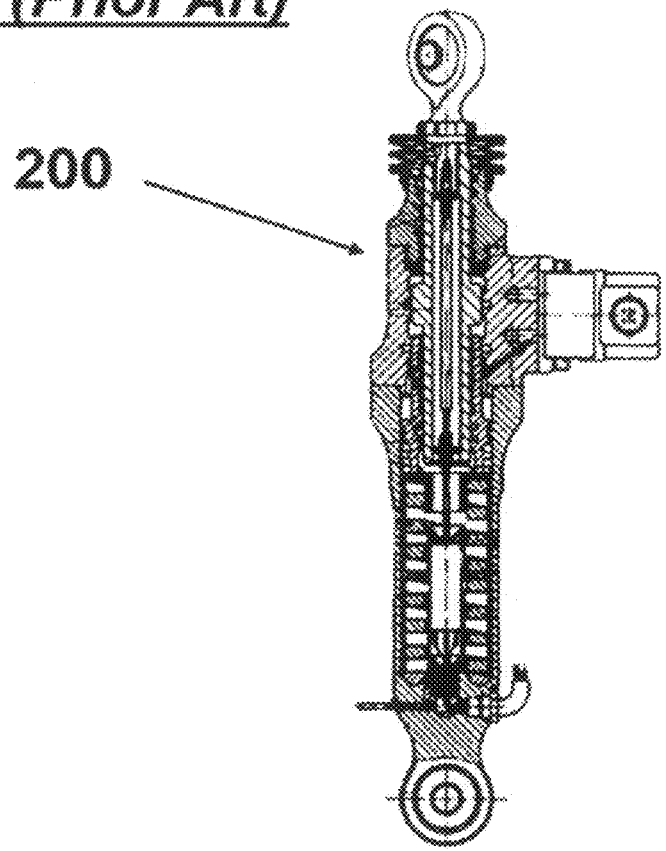
FIG. 2 is a cutaway illustration of a prior art hydraulic linear actuator.
Figure 3:
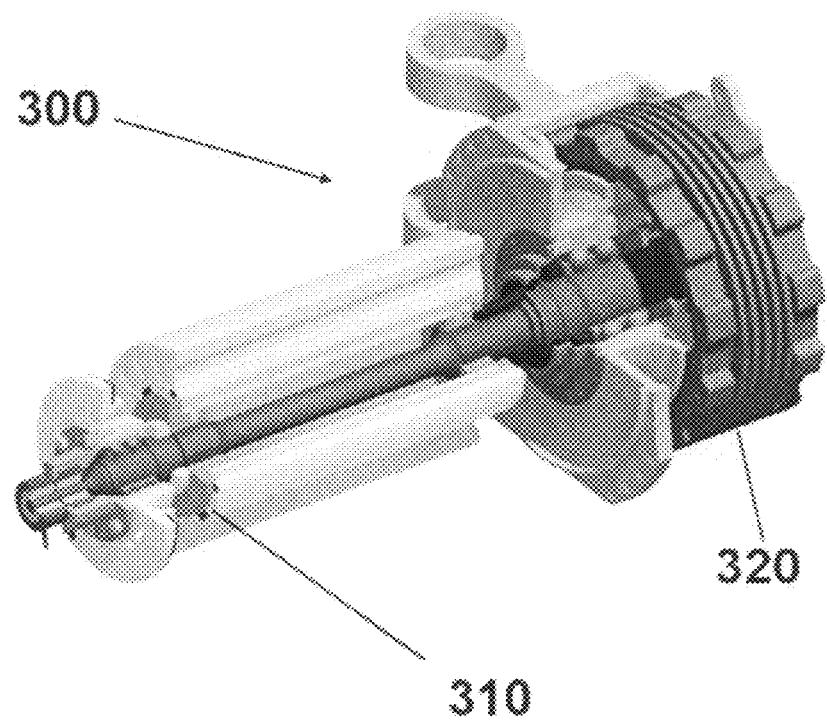
FIG. 3 is a perspective illustration a prior art electric blade pitch actuator.
Figure 4:
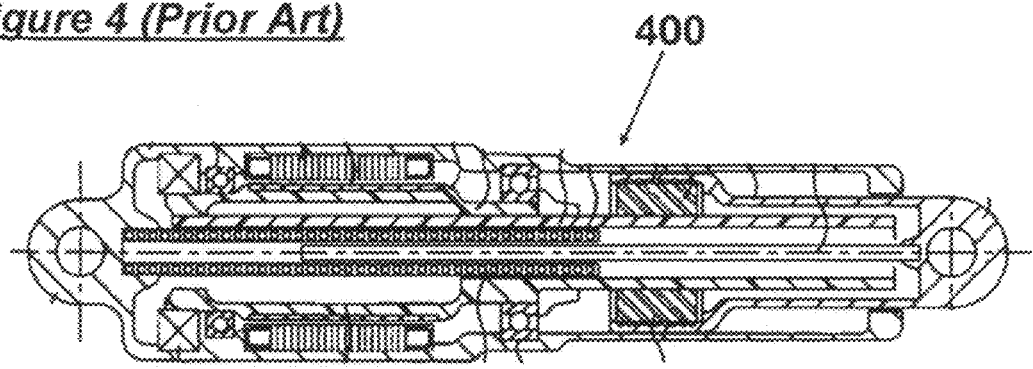
FIG. 4 is a cutaway drawing of a prior art electric linear actuator.

What is claimed in this application is a swashplateless rotor that uses an electric linear actuator to pitch the blades in rotary motion. That just hasn't been done in the prior art known to the applicant. The only known swashplateless rotors in the prior that pitch the blades use rotary actuated systems (such as the ZF system of FIG. 3). Linear actuators (such as the Waide system of FIG. 4) are only known to be used in conjunction with swashplate. Nor would one of ordinary skill in the art combine ZF with Waide. There is no benefit at all of using a rotary actuator with a swashplate, and no benefit of using a linear actuator if the blades are going to be rotated anyway using a rotary actuator. One of ordinary skill in the art uses rotary actuators for rotary motion and linear actuators for linear motion.

Thus, specific embodiments and applications of a fault tolerant actuator for swashplateless rotorcraft have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An improved rotorcraft comprising a hingeless, swashplateless rotor having a rotor blade, wherein the improvement comprises an electric linear actuator disposed to pitch the blade in rotary motion, wherein the actuator further comprises an electric motor comprising a plurality of stator teeth and at least four phase windings, with at least one tooth being disposed to lie between neighboring phase windings.

2. The rotorcraft of claim 1, wherein the actuator further comprises a planetary roller screw that couples rotation of the motor with pitch of the blade.

3. The rotorcraft of claim 2, wherein the blade is mounted to a hub, and at least a portion of the motor is disposed external to the hub and to the blade.

4. The rotorcraft of claim 3, wherein the actuator is coupled to the hub and disposed in such a way that the actuator can be uncoupled from the hub without removing or uncoupling the blade from the hub.

5. The rotorcraft of claim 2, wherein the actuator includes an internal spherical joint.

6. A rotorcraft having a rotor blade configured to pitch about a pitch axis coupled to an actuator, the actuator comprising:
an output link configured to provide linear translation;
an electric motor with rotary output;
a planetary roller screw coupled to the electric motor; and
an internal spherical joint coupling the output link with the planetary roller screw.

7. The rotorcraft of claim 6, further comprising an external spherical joint coupled to the output link.

* * * * *